May 31, 1932. P. E. FENTON 1,861,117
SELF LOCKING FLOATING TRIM STUD
Filed Nov. 14, 1927
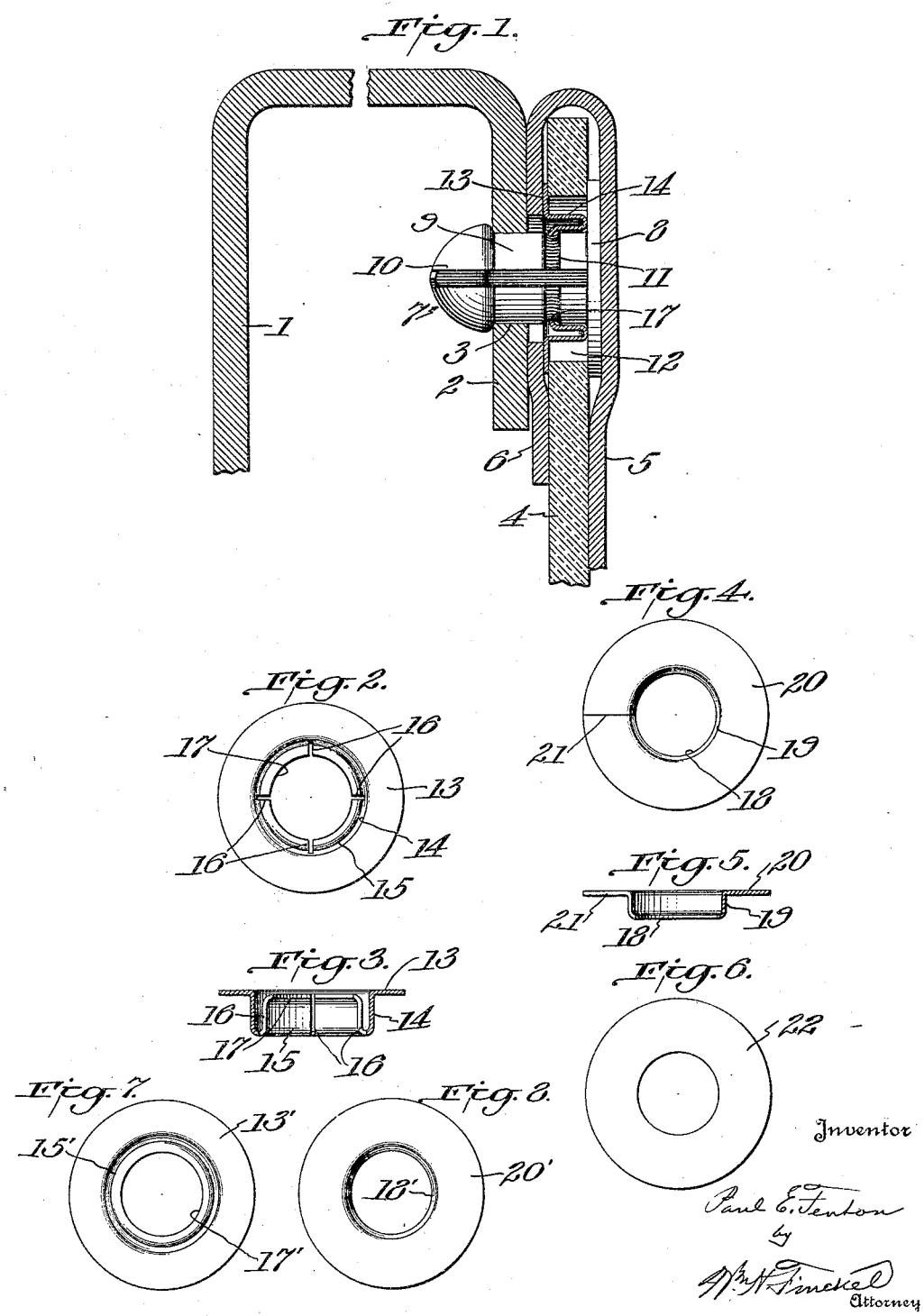

Patented May 31, 1932

1,861,117

UNITED STATES PATENT OFFICE

PAUL E. FENTON, OF THOMASTON, CONNECTICUT, ASSIGNOR TO SCOVILL MANUFACTURING COMPANY, OF WATERBURY, CONNECTICUT, A CORPORATION OF CONNECTICUT

SELF LOCKING FLOATING TRIM STUD

Application filed November 14, 1927. Serial No. 233,195.

The object of this invention is to provide a stud for use primarily, but not exclusively, in attaching the trimming to automobile bodies which are built of metal, the stud being secured in place in such way that it may move or float on its attaching or supporting element to accommodate itself to the location of its complementary socket member.

In assembling the studs, it is desirable to have some means for retaining the stud in position when applied to the cardboard or other attaching or supporting element, but this means must be of such a character as not to injure the elastic limit of the spring shank and head of the stud, and it is also desirable that this means should be connected with the stud in a substantially fixed relation which will not interfere with the floating character of the stud by which the stud may move on its attaching or supporting element in seeking to register with the hole in a metallic element which it engages.

The invention consists of a stud having a resilient head and shank, the shank being provided with a circumferential compressed knurl or recess, and a means for attaching the stud to the cardboard or other attaching or supporting element, in such way as to permit the stud to float into position to engage the complemental member of the fastener, such means comprising a washer which engages the knurl or recess and the whole constituting a self-locking floating trim stud, as I will proceed now to explain more fully and finally claim.

In the accompanying drawings illustrating the invention, in the several figures of which like parts are similarly designated, Figure 1 is a sectional elevation of parts of a metallic element, the attaching or supporting element, the upholstery and the stud and its retaining washer in position of use. Fig. 2 is a top plan view, and Fig. 3 is a cross section of one form of washer or stud-retaining element. Fig. 4 is a top plan view, and Fig. 5 a cross section of another form of washer or stud-retaining element. Fig. 6 is a top plan view of a non-resilient washer that might be used in place of the spring washers. Fig. 7 is a plan view showing substantially the construction of washer shown in Figs. 2 and 3, excepting that it is rigid or non-resilient. Fig. 8 shows a washer of substantially the same construction as that shown in Figs. 4 and 5, excepting that it is rigid or non-resilient.

As already stated, the invention is primarily designed for use in attaching the trimming or trim of metal-bodied automobiles, but it is obvious that it may be applied to other articles where useful. I will describe my invention as applied to automobile bodies; and referring to Fig. 1, the numeral 1 may indicate a cross section of an angular metal door frame of an automobile, having the inturned flange 2 provided with the openings 3, which last serve as sockets to engage the heads of the stud members. 4 may represent the cardboard or other attaching or supporting element or member used in trimming the frame, and 5 may represent the trimming of leather, cloth or other material, which is laid over the outer side of the cardboard and its end or edge 6 turned over upon the inner side of the cardboard and confined by the fastening means comprising the socket 3, and a stud, designated generally by the numeral 7.

In this invention, the stud comprises a base or flange 8, from which rises the longitudinally divided or split spring shank 9, terminating in a similarly divided or split spring head 10 having a portion of greater diameter than the shank. The shank is provided with a circumferential compressed knurl or recess 11, and this knurl or recess is used to receive and engage a washer, the body or flange of which engages the inner surface of the stud-attaching or supporting element in such way as to permit the stud to float within the hole 12 in the cardboard or attaching or supporting element, which hole is of larger diameter than the greatest diameter of the stud-engaging portion of the washer, so that the stud may float in this hole in its effort to register with the hole 3 in the metallic part 2.

There are shown three different forms of washers which may be employed as means for retaining the stud in floating engaged position with the cardboard. In Figs. 2 and 3, the washer comprises a flange 13 which when in position overlies the inner face of the cardboard, and a depending flange 14, which is turned upwardly at 15 and slitted as at 16, and its upper edge provided with the inturned lip 17, through which the slits 16 extend. The slitting of the parts 15 and 17 renders the washer elastic or resilient to a sufficient degree to slip over the superior diameter of the head of the stud and then resume its normal diameter when it reaches the shank and is pressed down with its lip in engagement with the knurl or recess 11. As will be understood, this engagement of the washer with the stud serves to keep the stud in place on the cardboard without interfering with its floating capacity.

The same is true of the washer shown in Figs. 4 and 5, excepting that the lip 18 is made on the bottom of the depending flange 19, and resiliency is obtained by radially slitting the body 20 and the lip 18 and flange 19, as indicated at 21. The operation of this form of washer is substantially the same as that previously described.

Another form of washer is shown in Fig. 6, which is simply a flat annulus 22, having its opening of proper size to slip over the head of the stud by compressing the stud, and then after it reaches the shank the spring elements of the head and shank will resume normalcy so as to engage the washer.

As stated, Figs. 7 and 8 represent the washers of Figs. 2–3 and 4–5 respectively, excepting that the slits are omitted; or in other words, it is possible to use the structures of Figs. 2–3 and 4–5 as non-resilient washers which may be applied to the stud in substantially the same way as the rigid or non-resilient washer of Fig. 6. In all of these non-resilient washers, dependence for resiliency is placed entirely on the stud, but the knurl or recess in the stud is of sufficient depth that when a non-resilient washer of any of these forms is forced over the head and the shank of the stud, it falls into the knurl or recess, which is its final resting place, and comes to rest, thus relieving all strain on the stud. It will be seen, therefore, that in the use of the rigid or non-resilient washers, the stud only being resilient, serves to absorb the entire strain of mounting. In the case of the washers of Figs. 7 and 8, which respectively have lips 17′ and 18′ corresponding in construction, function and operation to lips 17 and 18 of Figs. 3 and 5 respectively, excepting that they are rigid or non-resilient, it will be understood that these lips, when the washer is mounted on the stud, rest in the knurl or recess of the stud, and as already stated, this knurl or recess is of sufficient depth to relieve all the tension on the stud, the diameter of the stud at the base of the knurl or recess being the same as the diameter of the hole in the washer.

The washer shown in Fig. 7 has the flange 13′, a depending flange corresponding to flange 14 of Fig. 3, and the upwardly turned portion 15′ corresponding to the part 15 of Fig. 3.

The washer shown in Fig. 8 has a body 20′ and a depending flange corresponding to flange 19 of Fig. 5, which terminates in lip 18′.

It will be observed that the stud in the act of receiving and retaining either the resilient or the non-resilient washer is not permanently deformed, but its head and shank yield resiliently.

Other variations in the details of construction are permissible within the principle of the invention and the claims following.

What I claim is:—

1. A self-locking floating trim stud, for assembly with a supporting element provided with a hole, said stud having a resilient head and shank and a base, the shank provided with a circumferential recess, the stud adapted to be assembled with the supporting element with its shank in said hole and its base and head at opposite sides of said element, the hole being of such diameter as to provide for lateral shifting of the shank therein, and a resilient washer adapted to be passed over the stud head and provided with an inturned lip for engagement with said recess, said base and washer acting in opposition to maintain said stud in laterally shiftable but relatively axially fixed relation to said supporting element.

2. A self-locking floating trim stud, for assembly with a supporting element provided with a hole, said stud having a resilient head and shank and a base, the shank provided with a circumferential recess, the stud adapted to be assembled with the supporting element with its shank in said hole and its base and head at opposite sides of said element, the hole being of such diameter as to provide for lateral shifting of the shank therein, and a resilient washer adapted to be passed over the stud head and provided with a flange arranged to extend longitudinally of said shank and having an inturned lip for engagement with said recess, said base and washer acting in opposition to maintain said stud in laterally shiftable but relatively axially fixed relation to said supporting element.

3. A self-locking floating trim stud, for assembly with a supporting element provided with a hole, said stud having a resilient head and shank and a base, the shank provided with a circumferential recess, the stud adapted to be assembled with the supporting element with its shank in said hole and its base and head at opposite sides of said element, the hole being of such diameter as to provide for lateral shifting of the shank therein, and a washer adapted to be passed over the stud head and provided with a flange arranged to extend longitudinally of the shank in one direction and then reversely in the opposite direction and having an inturned lip, the reversely turned portion of said flange and the lip being slitted thereby to render the washer resilient, whereby the lip is adapted for spring engagement with said recess, said base and washer acting in opposition to maintain said stud in laterally shiftable but relatively axially fixed relation to said supporting element.

In testimony whereof I have hereunto set my hand this 10th day of November, A. D. 1927.

PAUL E. FENTON.